United States Patent Office 2,742,372
Patented Apr. 17, 1956

2,742,372

WATERPROOFING COMPOSITION

Wilbur Fay Colvin and Soloman L. Cramer, Oakland, Calif.; said Cramer assignor, by direct and mesne assignments, to said Colvin No Drawing. Application October 6, 1951, Serial No. 250,196

3 Claims. (Cl. 106—253)

This invention relates to materials utilized in building construction, maintenance and repair, and is particularly directed toward a novel composition adapted for waterproofing the surfaces of such buildings or any surface otherwise susceptible to moisture leakage.

Although the compound of our invention may be primarily discussed with reference to the use of the composition as a coating for roofs or wall surfaces of a structure, it will become apparent that the same may be readily utilized for coating surfaces other than those of a building structure and possessing a wide range of physical characteristics.

An object of our invention is to provide a composition which, when applied to the exterior and/or interior surface of a building, will effectively prevent the seepage of water through such a surface.

Another object of the present invention is to provide a composition of the type described which may be conveniently made with either a paste or liquid consistency, whereby the product may be more conveniently applied to a surface or other article.

A further object of this invention is to provide a waterproofing composition of the above type having superior adhesive qualities, irrespective of the type of material on which the composition is applied.

A still further object of our invention is to provide a moisture resistant substance which, after being applied to a surface, will remain in an elastic and pliable condition over long periods of exposure to varying climatic conditions.

Yet another object of the invention is to provide a composition of the above nature which will retain its cohesive qualities without becoming brittle after continuous usage.

A further object of our invention is to provide a waterproofing material which may be used as a liner for liquid receptacles without imparting any discoloration or foreign tastes to the liquid contained therein.

Still another object of the invention is to provide a method of mixing certain basic ingredients under predetermined temperature conditions so as to produce a composition possessing the heretofore described features of advantage.

A still further object of the invention is to provide both a liquid and paste substance of the type described which may be stored in relatively air tight containers for extensive periods without resulting in deleterious physical or chemical changes in the substance.

The invention possesses other objects and features of advantage, some of which, with the foregoing, will be set forth in the following description. It is to be understood, however, that variations in the disclosure made by the description may be adopted within the scope of the invention as set forth in the claims.

In broad terms, the compound of this invention is composed of several readily available ingredients, and by mixing the ingredients in a manner presently to be described, a water-proofing substance is obtained which may be conveniently applied to a wall, roof, or other surface. As the composition may have either a liquid or paste consistency, depending on the quantities of certain of the ingredients, it will of course be understood that the method of application will vary. In the liquid state, a brush may be used for applying the product to a surface, and when in the pasty state, a spatula or like applicator may be conveniently utilized. Although certain of the now to be described ingredients have previously been used in roofing or waterproofing compounds, by using the proportions of ingredients listed below, and by following the method of mixing the same, a far superior product will be obtained which possesses all of the features set forth above which are obviously of advantage in substances of this nature.

In making the pasty compound, which is particularly well adapted for roofing or other structural purposes, we prefer to use the following ingredients in substantially the proportions set forth. It is naturally understood that the quantities listed are merely by way of example and to indicate the relative proportions of the component parts of the substance.

| | | |
|---|---|---|
| Asphalt (melting point 185 degrees–210 degrees F.) | lbs | 75–100 |
| Kerosene | gallons | 5–6 |
| Paint thinners | do | 5–6 |
| Linseed oil (boiled) | quarts | 1–2 |
| Turpentine (gummed) | do | 1–2 |
| Silica (200 mesh) | pounds | 3–4 |
| White creosote | quarts | 2–3 |

In terms of weight, the asphalt would comprise approximately fifty per cent of the finished compositions; the silica, five per cent; the kerosene, twenty per cent; the creosote, linseed oil, and turpentine making up the balance.

Should it be desired to have the compound in a more liquid state, it is only necessary to increase the quantities of kerosene, thinners, linseed oil and turpentine until the desired consistency is obtained. Also, it should be made clear that the proportions will vary considerably depending on the nature of the surface to which the compound is to be applied. For example, if the compound is used as a coating for old, dry wood, the quantities of linseed oil and creosote would be increased. Likewise, if the compound is used on a porous surface, the liquid ingredients would be increased to act as a primer for the surface, and, if necessary, a subsequent and more viscous coating could then be applied. Thus, the ingredients set forth above should not be deemed limiting or restricting the scope of the invention, as the person applying the compound will vary the proportions depending on the physical characteristics of the material on which the compound is placed.

In preparing the composition, the asphalt is first changed to a more liquid state by heating the same to a temperature of from 250 degrees to 500 degrees F. After the asphalt is thoroughly heated and melted, the siliceous material is slowly added and completely stirred therein. As is known in the art, asphalt or asphaltic bitumen is a native mixture of hydrocarbons, and by heating the same to the above temperatures, certain chemical phenomena occur. Among these is the expulsion of sulphurous gases from the asphalt. By adding silica to the molten asphaltic mass, a porosity is created in the mixture which accelerates the escape of certain gaseous substances from the asphalt which otherwise would tend to rapidly harden upon exposure to the atmosphere. By thus removing such substances, the silica-asphalt mixture will tend to resist hardening and remain in a more pliable elastic state for substantial periods of time. In this manner, the quick hardening and cracking of conventional weatherproofing or roofing compounds is materially reduced or even eliminated.

After the silica and asphalt have been stirred to provide a relatively homogeneous mixture, the product is preferably removed from the heat, and the kerosene and thinners are added and mixed in the product. While constantly stirring the mixture, the white creosote is added and while continuing the stirring, the product is permitted to cool to approximately 150 degrees F., and the linseed oil and turpentine is introduced, and the stirring is then continued for a matter of 5 or 10 minutes.

The various liquid ingredients have been selected due to certain properties contained therein whereby the finished product will possess the desired spongy or resilient characteristics. To retain such characteristics the linseed oil is utilized, this ingredient further rendering a cohesive quality to the mixture, by virtue of its gum residue. The white creosote is added to a hot mixture and results in the freeing of certain creosote oils which together with the linseed oil assist in the retention of the pliable characteristics of the compound. Kerosene, which is also a mixture of hydrocarbons, is broken down under heat, and while certain portions will escape from the mixture in a gaseous form, the heavier distillate oils will remain in the mixture and will assist in rendering the finished compound more pliable. Paint thinners are well known for use in diluting a solution of paint or lacquer, and their use in the present compound permits the product to set up upon exposure to air and at the same time keeps the product in a soft and readily applicable condition during its storage in a tightly shut container or the like. With respect to the previously mentioned creosote, this ingredient also gives the mixture more penetrating properties when the latter is applied to wood or other relatively soft surfaces. The turpentine adds to the texture of the compound and renders the same easier to apply.

It would at first appear that the heating of the asphalt would cause the evaporation of the more volatile hydrocarbons therefrom, but by adding the silica to the heated asphalt, the pores of the mass are substantially closed, and thus certain of the more pliable and resilient portions of the asphalt are trapped and remain in the product which, together with the liquid ingredients above described, render the product cohesive yet pliable in either a hot or cooled condition.

The product can be applied to entire surfaces of a building or merely to fill cracks, seams or other localized areas where leakage has or is likely to develop. The compound has also been successfully applied in both the liquid and paste conditions to exterior building surfaces during heavy rainstorms without adversely affecting the resulting qualities thereof. Also, thin layers of the product have been applied to paper and like materials, and we have found it possible to bend or roll the paper without cracking the compound after substantial periods of time during which tar or other previously used substances would have set up into a highly brittle and frangible condition.

We claim:

1. A waterproofing composition including by weight approximately 50% asphalt, approximately 5% silica, approximately 20% kerosene, and less than 25% of linseed oil, turpentine and white creosote.

2. A method of preparing a waterproofing composition comprising heating asphalt to a temperature of from 250 degrees to 500 degrees F., stirring a quantity of silica in said asphalt, removing the asphalt and silica from said heat, adding a quantity of kerosene to the mixture, cooling the mixture to a temperature of approximately 150 degrees F., and adding a quantity of linseed oil to the mixture.

3. A method of preparing a composition for waterproofing surfaces comprising heating asphalt above its normal melting point, stirring a siliceous product in said heated asphalt, adding a liquid hydrocarbon and creosote to said mixture, cooling said mixture to approximately the melting point of said asphalt, stirring said mixture in a quantity of linseed oil, and continuing the stirring of the mixture for an additional period of time while the mixture is permitted to cool.

References Cited in the file of this patent

UNITED STATES PATENTS

| 160,784 | Mulligan | Mar. 16, 1875 |
| 409,504 | Richardson | Aug. 20, 1889 |
| 569,859 | Cotter et al. | Oct. 20, 1896 |
| 706,119 | Shaw | Aug. 5, 1902 |
| 935,572 | Amies | Sept. 28, 1909 |
| 2,086,968 | Stafford | July 13, 1937 |
| 2,115,775 | Hunt | May 3, 1938 |
| 2,214,904 | Johnson | Sept. 17, 1940 |